United States Patent [19]

Twisselmann

[11] Patent Number: 4,554,938

[45] Date of Patent: Nov. 26, 1985

[54] DEVICE FOR CONVERTING ELECTRIC SIGNALS INTO PNEUMATIC SIGNALS

[75] Inventor: Lorenz Twisselmann, Prisdorf, Fed. Rep. of Germany

[73] Assignee: VDO Adolf Schindling AG, Frankfurt am Main, Fed. Rep. of Germany

[21] Appl. No.: 461,367

[22] Filed: Jan. 27, 1983

[30] Foreign Application Priority Data

Feb. 17, 1982 [DE] Fed. Rep. of Germany ....... 3205576

[51] Int. Cl.[4] ............................................ G05D 16/00

[52] U.S. Cl. ........................................ 137/82; 137/84; 251/129.15; 335/230

[58] Field of Search ...................... 137/84, 625.64, 82; 251/141; 335/230, 229

[56] References Cited

U.S. PATENT DOCUMENTS

| | | | |
|---|---|---|---|
| 2,338,909 | 1/1944 | Eichborn | 335/231 |
| 2,761,982 | 9/1956 | Donat | 335/230 |
| 2,836,733 | 9/1974 | Cragg | 335/231 X |
| 4,227,164 | 10/1980 | Kitahara | 335/230 |
| 4,306,589 | 12/1981 | Harned et al. | 251/141 |
| 4,336,819 | 6/1982 | Nishihara | 137/84 |

FOREIGN PATENT DOCUMENTS

| | | | |
|---|---|---|---|
| 2114784 | 10/1971 | Fed. Rep. of Germany | 335/229 |
| 1080986 | 12/1954 | France | 335/230 |

*Primary Examiner*—Alan Cohan
*Attorney, Agent, or Firm*—Martin A. Farber

[57] ABSTRACT

In a device for converting electric signals into pneumatic signals, a soft-iron core (3) and a coil (2) are arranged stationary. The soft-iron core has an air gap (7) between two pole shoes (5, 6). A permanent magnet (8) is movably arranged within this gap (7) or directly in front of it. The permanent magnet can be fastened, for instance, to one lever arm of a rocker (9). The other lever arm of the rocker (9) is then developed as baffle plate (11) adapted to throttle the stream of air emerging from a pneumatic nozzle (12) to a greater or lesser extent depending on the position of the rocker. The dynamic pressure of this stream of air is fed via a booster (15) to an outlet (20).

16 Claims, 2 Drawing Figures

DEVICE FOR CONVERTING ELECTRIC SIGNALS INTO PNEUMATIC SIGNALS

Figure 1:
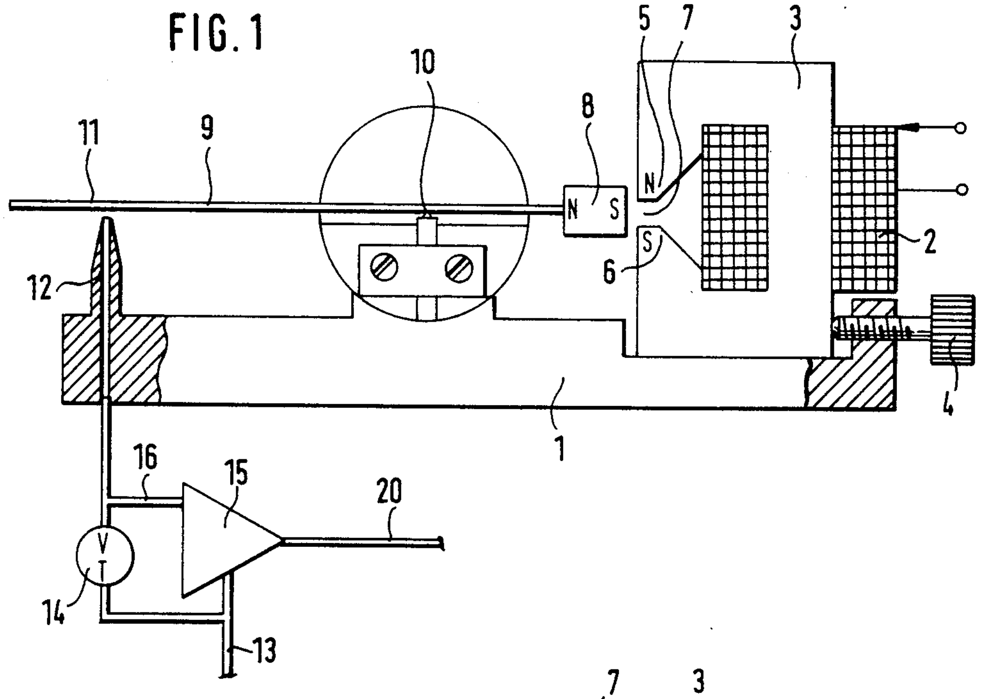

The present invention relates to a device for converting electric signals into pneumatic signals, it having a coil and a permanent magnet whose position relative to each other is variable under the action of a current flowing within the coil while influencing a pneumatic signal, said device having a mechanical means of adjustment for influencing the pneumatic system.

Such devices are generally known and customary in control engineering.

Generally devices of this type operate in accordance with the moving-coil principle. In such case the moving coil is part of the moving part of the system and the permanent magnet is part of the stationary part of the system. Moving-coil systems have very good linearity upon the conversion of current into force. However, they have the disadvantage that if the moving coil which forms part of the moving system has a sufficiently small resistance but sufficient length of wire it then has a mass which is high as compared with the force produced. As a result, such devices are sluggish and sensitive to vibration. The sluggishness of the device is the result also of the electric leads required for the coil, as a result of which its mobility is reduced.

If, in lieu of a moving-coil system the coil were made stationary and the permanent magnet movable, there would then be an even greater mass of the moving system so that such arrangements can, as a general rule, not be utilized.

The object of the present invention is to create a device of the aforementioned type for converting electric signals into pneumatic signals in which the moving mass is as small as possible.

This object is achieved in accordance with the invention in the manner that the permanent magnet (8, 17) is arranged for movement within the field of attraction of the two pole shoes (5, 6) of a stationary soft-iron core (3) which is closed by an air gap (7) and passed through the coil (2).

In the device of the invention both the coil and its soft-iron core can be stationary. A relatively small magnet is sufficient as permanent magnet so that the device of the invention need have only a very small moving mass and therefore works without sluggishness. Due to its slight moving mass the device is also suitable for installation in an automotive vehicle since the jolts which occur there upon travel do not act on large moving masses. Therefore, great robustness can be obtained at relatively little structural expense.

The excellent proportionality between the current I and the pressure p at the outlet of the device should also be emphasized.

The device is particularly simple from the standpoint of manufacture if the permanent magnet (8) is arranged in front of the air gap (7) of the soft-iron core (3).

Particularly high useful forces are obtained by another advantageous embodiment of the invention in accordance with which the permanent magnet (8) is arranged in the air gap (7) of the soft-iron core (3). This embodiment also has the advantage that the dimensions of the device are particularly small.

It is advantageous to provide as mechanical adjustment means a baffle plate (11) arranged in front of the outlet of a pneumatic nozzle (12). The pressure in the pneumatic system is then influenced in simple fashion by a change in the distance between the baffle plate and the nozzle and thus by a change in the dynamic pressure in the pneumatic system.

A very accurately operating system which is low in friction is obtained if the permanent magnet (8) is arranged on one lever arm and the baffle plate (11) on the other lever arm of a rocker (9). Furthermore, it is then readily possible to influence the forces by varying the lever-arm lengths. In this way, easy adjustment of the device is possible by, for instance, changing the fulcrum of the rocker or the distance of the permanent magnet from the fulcrum.

Particularly high magnetic forces will, of course, act on the permanent magnet if it is arranged directly within the air gap. If this permanent magnet (17) is provided directly with a baffle plate (11) and if it is arranged swingably within the air gap (7), an optimally small and thus compact device which produces high useful forces is obtained.

Easy adjustment of the operating range of the device from, for instance, 0–20 mA to 4–20 mA is readily possible if the soft-iron core (3) of the device is displaceable relative to the permanent magnet (8, 17).

Furthermore, in accordance with the invention, the force on the magnet can be changed by a variable magnetic shunt bridging the air gap.

Other embodiments of the invention are possible.

Figure 2:
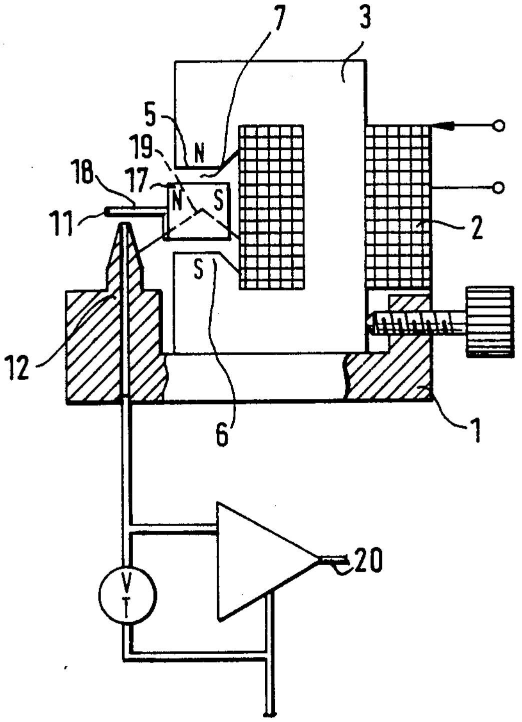

With the above and other objects and advantages in view, the present invention will become more clearly understood in connection with the detailed description of preferred embodiments, when considered with the accompanying drawings, of which:

FIG. 1 is a section through a first embodiment of the device in accordance with the invention; and FIG. 2 is a section through a second embodiment of the device in accordance with the invention.

The device shown in FIG. 1 has a base 1 on which a soft-iron core 3, passed through a coil 2, can be slightly displaced by a set screw 4. The soft-iron core 3 has an air gap 7 between pole shoes 5, 6.

Directly in front of the air gap 7 there is a permanent magnet 8 which is fastened to one lever arm of a rocker 9. The permanent magnet 8 preferably consists of a material of high coercive force, for instance a cobalt-samarium alloy. The rocker 9 is swingably mounted on a fulcrum 10 and is developed as baffle plate 11 on the lever arm thereof which is remote from the permanent magnet 8. This baffle plate 11 is arranged, as seen in the drawing, above the outlet opening of a pneumatic nozzle 12. Upon operation of the device, air continuously flows out of this nozzle 12, the air being fed to it by a feed line 13 via a throttle 14. The feed line 13 furthermore branches into a booster 15 whose inlet 16 is connected to the pressurized-fluid connection, leading to the pneumatic nozzle 12, between the throttle 14 and the nozzle 12. The dynamic pressure of the pneumatic nozzle 12 which is fed via the inlet 16 to the booster 15 is fed, intensified by the booster 15, to an outlet 20.

The device described operates as follows. When an increasing current flows within the coil 2, the magnetization of the soft-iron core 3 is increased. As a result, the magnetic force at the pole shoes 5 and 6 increases. The pole shoe 6, which is marked as south pole in the drawing, then increasingly repels the facing south pole of the permanent magnet 8, while the pole shoe 5 marked as north pole in the drawing increasingly attracts the south pole of the permanent magnet 8. The rocker 9 is swung by these forces in counterclockwise direction. As a result, the baffle plate 11 approaches the pneumatic nozzle 12 and more strongly throttles the air emerging from it. This leads to an increase in the dynamic pressure within the pneumatic system. This increased dynamic pressure is fed via the inlet 16 to the booster 15 and passes, intensified, to the outlet 20.

By displacing the soft-iron core 3 by means of the set screw 4, adjustment of the range of the device is readily possible. By reversing the polarity of the feed of the coil 2 a reversing characteristic of the device can be obtained.

Adjustment of the range is also possible by varying a magnetic shunt bridging the air gap.

The embodiment shown in FIG. 2 is functionally identical to that shown in FIG. 1 but its construction is somewhat different. In agreement with the embodiment of FIG. 1, a soft-iron core 3 having pole shoes 5 and 6 is arranged on a base 1, an air gap 7 being present between said pole shoes. Within said air gap 7 there is a permanent magnet 17 which, in its function, corresponds to the permanent magnet 8 of FIG. 1. The permanent magnet 17 is fastened to a small plate 18 which is mounted, for instance, with a strap 19 for rotation within the air gap 7. The plate 18 is again developed as baffle plate 11. Depending on the intensity of the current in the coil 2 which surrounds the soft-iron core, the permanent magnet 17 tilts to a greater or lesser extent within the air gap 7 so that the baffle plate 11 throttles the stream of air coming out of the nozzle 12 to a greater or lesser extent, and the dynamic pressure in the pneumatic system varies in the same way as the embodiment of FIG. 1, this variation being transmitted intensified by the booster circuit shown to an outlet 20.

In order to keep the construction of the device as simple as possible, the mount of the baffle plate 11 can be rigidly attached to the pneumatic nozzle 12.

The above embodiments have been disclosed by example only and not in a limiting sense.

I claim:

1. In a device for converting electric signals into pneumatic signals of a pneumatic system, the device having a coil and a permanent magnet which are moveable relative to each other in response to a current flowing within the coil, said device having a mechanical means of adjustment for influencing the pneumatic system, the improvement comprising a stationary core which is closed by an air gap and includes two pole shoes, the core passing through the coil to form said electromagnet;

a permanent magnet of highly coercive material disposed for movement within the field of attraction of the two pole shoes, means for mechanically connecting said permanent magnet to said adjustment means such that movement of said permanent magnet actuates said adjustment means, the moving mass of said permanent magnet and said connecting means and said adjustment means being minimized; and wherein said connecting means includes means for freely pivoting said connecting means such that movement of said permanent magnet operates said adjustment means in response to forces of said electromagnet upon said permanent magnet; and said pivoting means is located away from said air gap so as to preserve substantially a perpendicular relationship between a magnetization axis of said permanent magnet and a magnetic flux in said air gap.

2. The device as set forth in claim 1, wherein the permanent magnet is positioned in front of the air gap of the core, said core being of soft iron.

3. The device as set forth in claim 1, wherein the mechanical adjustment means is a baffle plate arranged in front of the outlet of a pneumatic nozzle.

4. The device as set forth in claim 1, wherein said connecting means is configured as a rocker having a first lever arm and a second lever arm extending from a pivot of said pivoting means, and the permanent magnet is located on said first lever arm and the baffle plate is located on said second lever arm.

5. The device as set forth in claim 3, wherein said permanent magnet is located on one end of a rocker for rotation relative to said pole shoes, said baffle plate being located at a second end of said rocker.

6. In a device for converting electric signals into pneumatic signals of a pneumatic system, the device including an electromagnet with an iron core having an air gap and a mechanical adjustment means which actuates the pneumatic system, the mechanical adjustment means being controlled by the electromagnet, the improvement wherein the adjustment means carries a little permanent magnet which is made of a highly coercive material and is smaller than said core, said permanent magnet being essentially disposed symmetrically outside of the iron core in front of the air gap for drawing the permanent magnet toward the air gap in a currentless condition of the electromagnet.

7. In a device for converting electric signals into pneumatic signals of a pneumatic system, the device including an electromagnet with an iron core having an air gap and a mechanical adjustment means which actuates the pneumatic system, the mechanical adjustment means being controlled by the electromagnet, the improvement wherein the adjustment means carries a little permanent magnet which is made of a highly coercive material and is disposed in the air gap with its magnetizing axis aligned perpendicularly with respect to the direction of the magnetic flux of the electromagnet in such manner that in a currentless condition of the electromagnet, the permanent magnet exerts equal forces upon the ends of a ferromagnetic circuit of the electromagnet said adjustment means connecting with said permanent magnet and being located adjacent said air gap.

8. The device as set forth in claim 6, wherein the mechanical adjustment means is a baffle plate arranged in front of the outlet of a pneumatic nozzle of the pneumatic system.

9. The device as set forth in claim 6, wherein the permanent magnet is located on one lever arm and the baffle plate is located on the other lever arm of a rocker.

10. The device as set forth in claim 6, wherein the iron core of the device is displaceable relative to the permanent magnet.

11. The device as set forth in claim 8, further comprising a rocker interconnecting said baffle plate with said permanent magnet and wherein said permanent magnet is located on one end of said rocker for movement past said gap, said baffle plate being located at a second end of said rocker.

12. The device as set forth in claim 7, wherein the mechanical adjustment means is a baffle plate arranged in front of the outlet of a pneumatic nozzle of the pneumatic system.

13. The device as set forth in claim 8, further comprising a rocker interconnecting said baffle plate with said permanent magnet and wherein the permanent magnet is located on one lever arm and the baffle plate is located on the other lever arm of said rocker.

14. The device as set forth in claim 7, wherein the permanent magnet is provided directly with a baffle plate and arranged swingably within the air gap, to obtain an optimally small and thus compact device which produces high useful forces.

15. The device as set forth in claim 7, wherein the iron core of the device is displaceable relative to the permanent magnet.

16. The device as set forth in claim 12, further comprising strap means for pivotally supporting said permanent magnet in said air gap; and wherein said permanent magnet is located on one end of said baffle plate for rotation relative to said gap about said strap means.

* * * * *